US 9,182,921 B2

(12) United States Patent
Sivakumar et al.

(10) Patent No.: US 9,182,921 B2
(45) Date of Patent: *Nov. 10, 2015

(54) METHOD AND SYSTEM FOR PROVIDING SUBSTANTIALLY CONSTANT-TIME EXECUTION OF A COPY OPERATION

(71) Applicant: NetApp, Inc., Sunnyvale, CA (US)

(72) Inventors: Naresh Sivakumar, Bangalore (IN); Dnyaneshwar Pawar, Bangalore (IN); Bipul Raj, Bangalore (IN); Albert Yong, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/875,164

(22) Filed: May 1, 2013

(65) Prior Publication Data
US 2013/0311735 A1   Nov. 21, 2013

Related U.S. Application Data

(63) Continuation of application No. 12/605,263, filed on Oct. 23, 2009, now Pat. No. 8,484,164.

(51) Int. Cl.
*G06F 17/30* (2006.01)
*G06F 3/06* (2006.01)

(52) U.S. Cl.
CPC ............... *G06F 3/065* (2013.01); *G06F 3/067* (2013.01); *G06F 3/0611* (2013.01); *G06F 17/3007* (2013.01)

(58) Field of Classification Search
CPC .................................. G06F 17/30088
USPC .................................................. 707/639, 640
See application file for complete search history.

(56) References Cited

U.S. PATENT DOCUMENTS

| | | | |
|---|---|---|---|
| 7,587,630 B1 | 9/2009 | Cassell et al. | |
| 7,676,514 B2 | 3/2010 | Faibish et al. | |
| 8,484,164 B1 | 7/2013 | Sivakumar et al. | |
| 8,671,072 B1* | 3/2014 | Shah et al. | 707/610 |
| 2003/0159007 A1 | 8/2003 | Sawdon et al. | |
| 2006/0174075 A1 | 8/2006 | Sutoh | |
| 2008/0301203 A1* | 12/2008 | Adkins et al. | 707/205 |
| 2009/0043978 A1 | 2/2009 | Sawdon et al. | |

OTHER PUBLICATIONS

"Data protection using Premium features", Powervault MD3000 and MD3000i, Dell Product group, Feb. 2008.*

* cited by examiner

*Primary Examiner* — Etienne Leroux
*Assistant Examiner* — Cindy Nguyen
(74) *Attorney, Agent, or Firm* — Cooper Legal Group, LLC

(57) ABSTRACT

A system and method for providing a substantially constant-time copy operation for file system objects managed by a storage server begins by generating a snapshot of at least a portion of a data set managed by the storage server. The system then performs a copy operation in the storage server to generate a copy of the data set separate from the snapshot, on a set of block locations containing a predetermined reference value. During the copy operation to generate the copy of the data set separate from the snapshot, the system can receive from a requester a first read request directed to the copy of the data set that the copy operation is to generate. In response to the first data request, the system provides data from the snapshot to the requester by the storage server.

16 Claims, 10 Drawing Sheets

METHOD AND SYSTEM FOR PROVIDING SUBSTANTIALLY CONSTANT-TIME EXECUTION OF A COPY OPERATION

PRIORITY CLAIM

This application is a continuation of U.S. patent application Ser. No. 12/605,263, entitled "Method and System for providing Substantially constant-time execution of a copy Operation", which was filed on Oct. 23, 2009, which is incorporated by reference herein in its entirety.

BACKGROUND

A network storage server is a processing system that is used to store and retrieve data on behalf of one or more hosts (clients) on a network. A storage server operates on behalf of one or more hosts to store and manage data in a set of mass storage devices, such as magnetic or optical storage-based discs or tapes. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other servers are capable of servicing both file-level requests and block-level requests, as is the case with certain storage servers made by NetApp, Inc. of Sunnyvale, Calif.

Storage servers typically can perform various operations on data system objects managed by the storage server. These include, among others, read, write, truncate, append, and copy operations. Operations are executed in response to corresponding requests received from a host. For example, a read operation is executed in response to a read request, a write operation is executed in response to a write request, etc. In a read operation, the storage server provides a requested data block (or blocks) from a target file system object. In a write operation, the storage server modifies one or more data blocks in a target file system object. A truncate operation removes data blocks from the end of the file system object, while an append operation adds data blocks to the end of the file system object.

An important file system operation is the copy (or clone) operation, in which the storage server generates a new file system object that has contents identical to the contents of a source file system object. The new (copy) file system object is generally unavailable for other operations until the copy operation is complete. Because the storage server must copy all of the contents of the source file system object before the object is available for other operations, the time to complete the copy operation varies depending on the size of the source file system object. If the source file system object is large, the copy operation may have a duration that is noticeable to a user and can interfere with the user's activities. For example, for an extremely large file, the copy operation could take significant user-perceivable time with present technology.

SUMMARY

The present disclosure relates to a system and method for providing a substantially constant-time copy operation for file system objects managed by a network storage server, which reduces the disruption to users when the object being copied is large. The copy operation is described as substantially constant time because the time period during which the user cannot execute other file system operations is independent of the size of the file system object. To support this, the system allows other file system operations to be executed on the new object before all of its data has been copied from the source object. While the data is copied to the new object, the system provides modified handling of file system operations that can be executed on the object. In particular, the system generates a snapshot of the source object before the copy process begins. If a read request is received during the copy process, the system provides data from the snapshot in response to the request. If a write request is received, the system modifies the new object based on the request as if the copy process had already completed. The copy process is then modified to skip copying data from the source object (i.e., omit a copy step) if it determines that the corresponding location was modified in the new object. The system provides additional operations to execute truncate and append operations during the copy process.

An advantage of this system is that it transforms copying from a variable-time process, in which the time to complete depends on the size of the file, to a substantially constant-time process. (The process is referred to as "substantially" constant time because the time required to create the copy may vary slightly depending on the amount of metadata associated with the file system object.) From a user's perspective, the time to copy a file is determined based on the time interval from the user initiating the operation until the user can perform file system operations on the new file. During a copy operation, the largest portion of time is consumed by the process of copying the data blocks to the new file. This time is reduced by copying the references to the data blocks instead of copying the data blocks themselves. Though this is much faster than copying the data blocks, it still takes user-perceivable time for very large files. By providing special handling of file system operations, the system is able to give the user access to the file even though the process of copying the indirect blocks is ongoing, thus making the copy operation substantially constant-time from the user's perspective.

DETAILED DESCRIPTION

Figure 1:
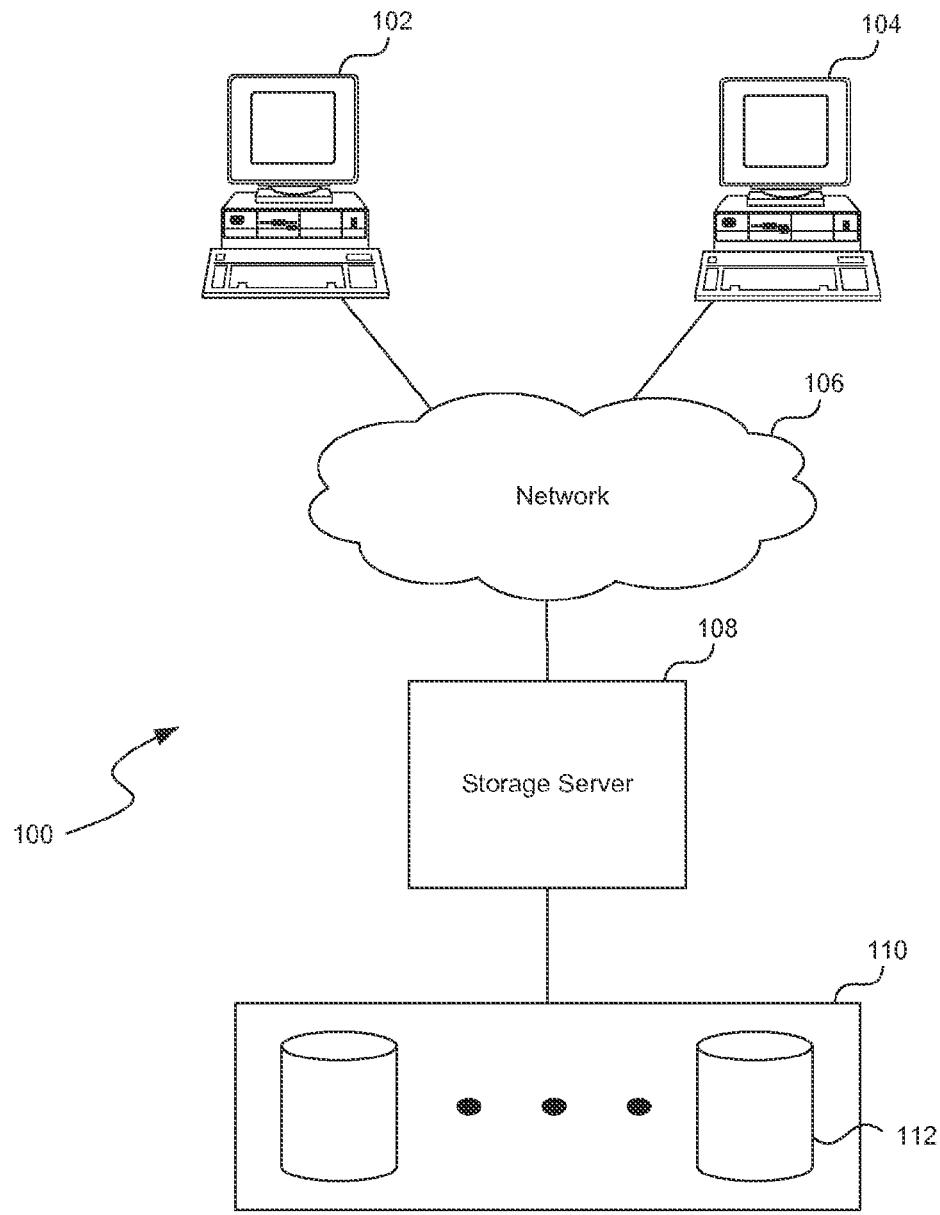
FIG. 1 illustrates a network environment which includes a storage server coupled to a storage subsystem.

A system and method for executing a substantially constant-time copy of a file is disclosed (hereinafter referred to as "the copy system" or "the system"). The system copies a file or other type of data object by generating a new metadata container (the "destination metadata container") and copying some metadata (e.g., access control information) from the source metadata container to the destination metadata container. After the destination metadata container has been created, the system copies each of the indirect blocks from the source metadata container to a corresponding location in the destination metadata container. The system then provides special implementations of file system operations to enable a user to execute the file system operations on the destination metadata container while the copying process is ongoing.

To support a read operation, the system generates a snapshot (i.e., a read-only, persistent, point-in-time image) of the source metadata container when the copy process begins. When the system receives a read request during the copy process, it first determines if the read request is directed to an indirect block that has not yet been copied or written to. If the block has been copied, the read is handled in the same way as if the copy process has completed. Otherwise, the system redirects the read request to a corresponding block in the snapshot and returns data associated with the corresponding block.

When the system receives a write request, it can handle the request in a similar manner for all indirect blocks in the destination metadata container. In particular, if the system receives a write request directed to a block that has already been copied, the request can be handled as a standard write request (discussed in greater detail below). If the system receives a write request directed to a block that has not yet been copied, the system executes the write operation and replaces the empty indirect block with a reference to the block created by the write operation. During the copy process, the system checks before copying an indirect block to determine if the corresponding indirect block in the destination metadata container has already been modified by a write operation. If the system determines that the indirect block has already been modified, it skips copying the indirect block by proceeding to the next indirect block from the source metadata container without copying the previous block.

The system also provides special handling for truncate and append operations. In order to support a truncate operation, the system maintains information specifying a range of data to copy to the destination metadata container. Initially, this range is determined based on the size of the source file. However, if the destination file is truncated, the system modifies the range of data accordingly. The system then uses the range to determine when to stop copying data from the source metadata container. For an append operation, the appended data blocks are added after the end of the range of data to be copied to the destination metadata container.

FIG. 1 is a network diagram of an environment 100 in which the copy system can operate. The various embodiments described herein are not limited to any particular environment, and may be implemented in various storage systems. In the present illustration, the environment 100 includes a storage server 108 which can implement the copy technique introduced here. The storage server 108 is coupled with a mass storage subsystem 110, which includes a set of mass storage devices 112, and to clients 102 through a network 106, such as a local area network (LAN) or other type of network. Each of the clients 102 may be, for example, a conventional personal computer (PC), workstation, or the like. The storage server 108 is also coupled to a management server 104, which includes management software configured to allow an administrator to manage the storage server 108 and the mass storage subsystem 110. The mass storage subsystem 110 is managed by the storage server 108. For example, the storage server 108 may receive and respond to various read and write requests from the clients 102, directed to data stored in or to be stored in the storage subsystem 110. The mass storage devices 112 in the mass storage subsystem 110 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

The storage server 108 may have a distributed architecture; for example, it may include separate N-module (network module) and D-module (data module) components (not shown). In such an embodiment, the N-module is used to communicate with the clients 102, while the D-module includes the file system functionality and is used to communicate with the storage subsystem 110. In another embodiment, the storage server 108 may have an integrated architecture, where the network and data components are all contained in a single box or unit. The storage server 108 further may be coupled through a switching fabric to other similar storage systems (not shown) that have their own local storage subsystems. In this way, all of the storage subsystems can form a single storage pool, to which any client of any of the storage systems has access.

Figure 2:
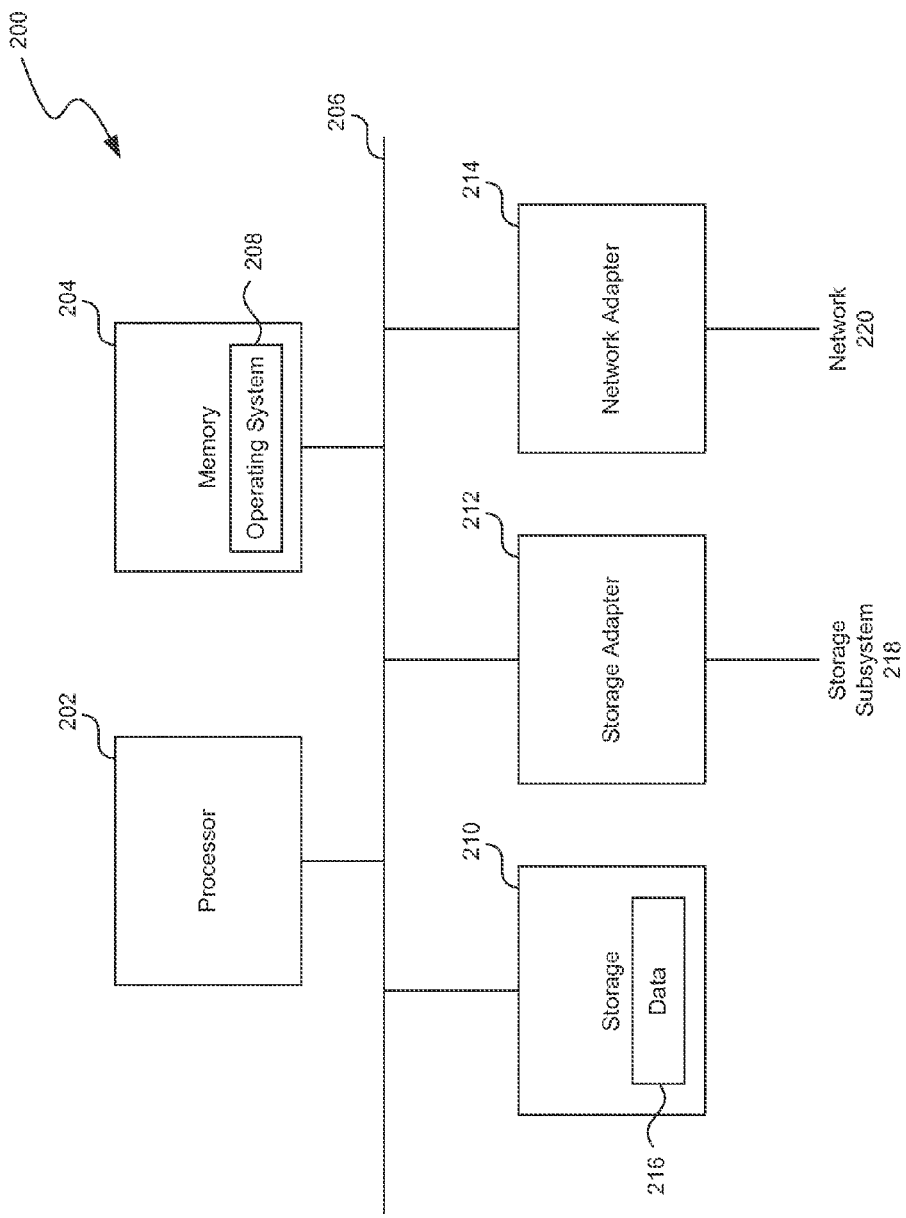
FIG. 2 is an example of the hardware architecture of a storage server.

FIG. 2 is a high-level block diagram showing an example of the architecture of a storage server 200. The storage server 200 may represent the storage server 108 of FIG. 1. The storage server 200 includes one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 202 may include central processing units (CPUs) of the storage server 200 and, thus, control the overall operation of the storage server 200. In certain embodiments, the processor(s) 202 accomplish this by executing software or firmware stored in memory 204. The processor(s) 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 204 is or includes the main memory of the storage server 200. The memory 204 represents any form of random access memory (RAM), read-only memory (ROM), flash memory, or the like, or a combination of such devices. In use, the memory 204 stores, among other things, a storage operating system 208 of the storage server 200.

A storage adapter 212 and a network adapter 214 are also connected to the processor(s) 202 through the interconnect 206. The storage adapter 212 allows the storage server 200 to access a storage subsystem 218 and may be, for example, a Fibre Channel adapter or a SCSI adapter. The network adapter 214 provides the storage server 200 with the ability to communicate with remote devices, such as clients, over a network 220 and may be, for example, an Ethernet adapter. The storage server 200 may further include local storage 210 coupled to the interconnect 206.

One skilled in the art will appreciate that the clients 102 and the management server 104 could be implemented using at least some of the same types of components. For example, the clients 102 or the management server 104 may also include a processor 202 and a memory 204 configured to store an operating system 208. The components are connected using an interconnect 206, such as a PCI bus or other system interconnection. The clients 102 or the management server 104 may also include a storage component 210, such as a hard drive or solid-state storage device, and a network adapter 214, as well as I/O devices (not shown).

Figure 3:
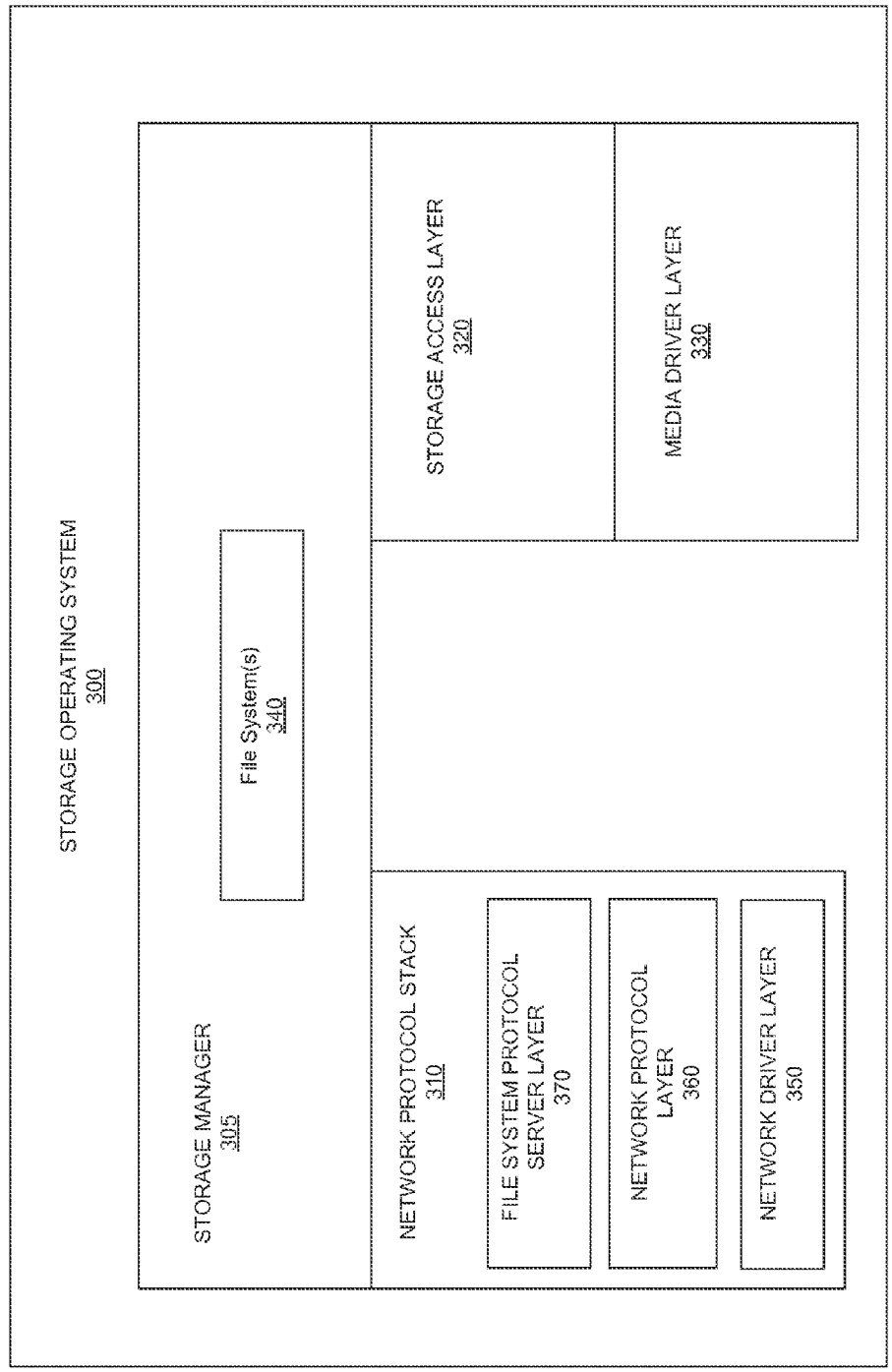
FIG. 3 is a block diagram of a storage operating system.

FIG. 3 is a block diagram of a storage operating system according to an illustrative embodiment. As used herein, the term "storage operating system" generally refers to the computer-executable code operable on a computer to perform a storage function that manages data access and other related functions. Storage operating system 300, which can be the storage operating system 208 in FIG. 2, can be implemented as a microkernel, an application program operating over a general-purpose operating system such as UNIX® or Windows NT®, or as a general-purpose operating system configured for the storage applications as described herein. In the illustrated embodiment, the storage operating system 300 includes a network protocol stack 310 having a series of software layers including a network driver layer 350 (e.g., an Ethernet driver), a network protocol layer 360 (e.g., an Internet Protocol layer and its supporting transport mechanisms: the TCP layer and the User Datagram Protocol layer), and a file system protocol server layer 370 (e.g., a CIFS server, a NFS server, etc.). In addition, the storage operating system 300 includes a storage access layer 320 that implements a storage media protocol such as a RAID protocol, and a media driver layer 330 that implements a storage media access protocol such as, for example, a Small Computer Systems Interface (SCSI) protocol. Any and all of the modules of FIG. 3 can be implemented as a separate hardware component. For example, the storage access layer 320 may alternatively be implemented as a parity protection RAID module and embodied as a separate hardware component such as a RAID controller. Bridging the storage media software layers with the network and file system protocol layers is the storage manager 305 that implements one or more file system(s) 340.

It is useful now to consider how data can be structured and organized by the storage server 108 in certain embodiments. Reference is now made to FIGS. 4A-4B and 5A-5B in this regard. In at least one embodiment, data is stored in the form of volumes, where each volume contains one or more directories, subdirectories, and/or files. The term "aggregate" is used to refer to a pool of physical storage, which combines one or more physical mass storage devices (e.g., disks) or parts thereof, into a single storage object. An aggregate also contains or provides storage for one or more other data sets at a higher-level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. A volume includes one or more file systems, such as an active file system and, optionally, one or more persistent point-in-time images of the active file system captured at various instances in time. As stated above, a "file system" is an independently managed, self-contained, organized structure of data units (e.g., files, blocks, or logical unit numbers (LUNs)). Although a volume or file system (as those terms are used herein) may store data in the form of files, that is not necessarily the case. That is, a volume or file system may store data in the form of other units of data, such as blocks or LUNs. Thus, although the discussion herein uses the term "file" for convenience, one skilled in the art will appreciate that the copy system can be used with any type of data object that can be copied. In some embodiments, the storage server uses one or more volume block numbers (VBNs) to define the location in storage for blocks stored by the system. In general, a VBN provides an address of a block in a volume or aggregate. The storage manager 305 tracks information for all of the VBNs in each storage server 108.

In addition, data within the storage server is managed at a logical block level. At the logical block level, the storage manager maintains a logical block number (LBN) for each data block. If the storage server stores data in the form of files, the LBNs are called file block numbers (FBNs). Each FBN indicates the logical position of the block within a file, relative to other blocks in the file, i.e., the offset of the block within the file. For example, FBN 0 represents the first logical block in a particular file, while FBN 1 represents the second logical block in the file, and so forth. Note that the VBN of a data block is independent of the FBN(s) that refer to that block.

In certain embodiments, each file is represented in the storage server in the form of a hierarchical structure called a "buffer tree." As used herein, the term buffer tree is defined as a hierarchical metadata structure containing references (or pointers) to logical blocks of data in the file system. A buffer tree is a hierarchical structure which is used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks" or "data blocks") of the file. All of the data in the file is stored only at the lowest level (L0) blocks. The root of a buffer tree is stored in the "inode" of the file. As noted above, an inode is a metadata container that is used to store metadata about the file, such as ownership, access permissions, file size, file type, and pointers to the highest-level of indirect blocks for the file. Each file has its own inode. The inode is stored in a separate inode container, which may itself be structured as a buffer tree. The inode container may be, for example, an inode file. In hierarchical (or nested) directory file systems, this essentially results in buffer trees within buffer trees, where subdirectories are nested within higher-level directories and entries of the directories point to files, which also have their own buffer trees of indirect and direct blocks. Directory entries include the name of a file in the file system, and directories are said to point to (reference) that file. Alternatively, a directory entry can point to another directory in the file system. In such a case, the directory with the entry is said to be the "parent directory," while the directory that is referenced by the directory entry is said to be the "child directory" or "subdirectory."

In some embodiments, the storage server manages the file system as a "write anywhere" file system, such as the proprietary Write Anywhere File Layout file (WAFL™) system developed by NetApp, Inc. Write-anywhere systems are not constrained to write any particular data or metadata to a particular storage location or region. Rather, write-anywhere systems can write to any unallocated block on any available mass storage device and do not overwrite data on the devices. If a data block on disk is updated or modified with new data, the data block is thereafter stored (written) to a new location on disk instead of modifying the block in place to optimize write performance.

For various reasons, it may be desirable to maintain a replica of a data object on the storage server. For example, in the event of a power failure or other type of failure, data lost at the source storage server can be recovered from the replica stored in the destination storage server. In at least one embodiment, the data set is a file system of the storage server and replication is performed using snapshots. A "snapshot" is a read-only, persistent, point-in-time image (RPPI) of the file system. This allows the state of the data set to be restored from the snapshot in the event of, for example, a catastrophic failure of the storage system or data corruption. The ability to restore data from a snapshot enables the storage server to revert the state of its data to a known previous point in time, as captured by the snapshot.

Figure 4A:
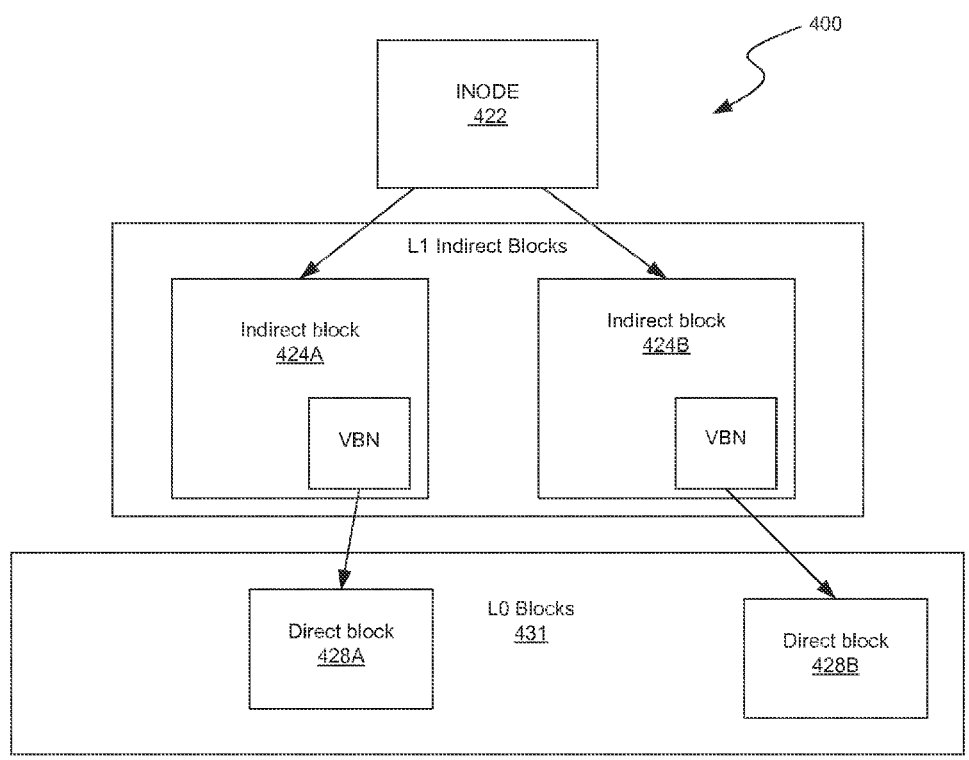
FIG. 4A depicts a buffer tree of a file.

FIG. 4A depicts a buffer tree of a file according to an illustrative embodiment. In the illustrated embodiment, a file is assigned an inode 422, which references Level 1 (L1) indirect blocks 424A and 424B. Each indirect block 424 stores at least one volume block number (VBN) that references a direct (L0) block stored on the storage subsystem 110. To simplify description, only one VBN is shown in each indirect block 424 in FIG. 4A; however, an actual implementation would likely include multiple/many VBNs in each indirect block 424. Each VBN references a direct block 428A and 428B, respectively, in the storage device.

Figure 4B:
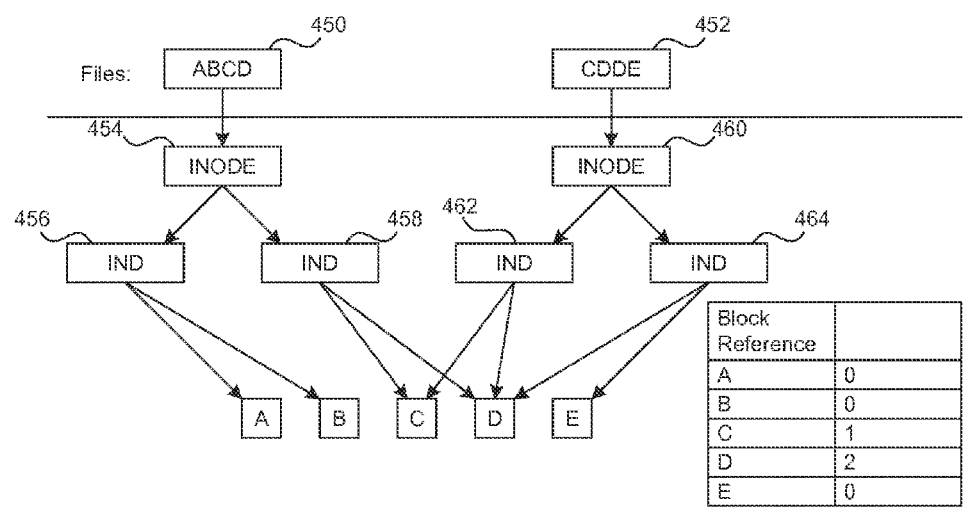
FIG. 4B shows an example of data block sharing between two inodes.

Some file systems, such as the WAFL system discussed above, share data blocks among multiple inodes in order to more efficiently use space in the storage system, i.e., to avoid unnecessary block duplication. FIG. 4B shows an example of data block sharing between two inodes that correspond to files 450 and 452. The file 450 includes data blocks A, B, C, D, while file 452 includes data blocks C, D, D, E. The file 450 is represented by a first inode 454, which includes indirect blocks 456 and 458. The file 452 is represented by a second inode 460, which includes indirect blocks 462 and 464. As shown in the figure, indirect block 456 includes references to data blocks A and B, while indirect block 458 then includes references to data blocks C and D. Similarly, indirect block 462 includes references to data blocks C and D, while indirect block 464 includes references to data blocks D and E. By sharing references to data blocks, the system reduces the amount of space consumed by the files 450 and 452. To support this functionality, the file system maintains a block reference count (shown in the table in FIG. 4B), which tracks the number of indirect blocks that reference each data block. When only a single indirect block references a data block (e.g., data blocks A, B, and E), the system stores a zero value for the data block's reference count. When a data block is referenced by two data blocks (e.g., data block C), the reference count is incremented to one, indicating that one additional block references the data block. Similarly, data block D is referenced by two additional indirect blocks, so the block reference table stores a value of two. As indirect blocks release their references to an individual data block, the system decrements the reference count. The system can then free a data block if the data block is no longer referenced by any indirect blocks.

Figure 5A:
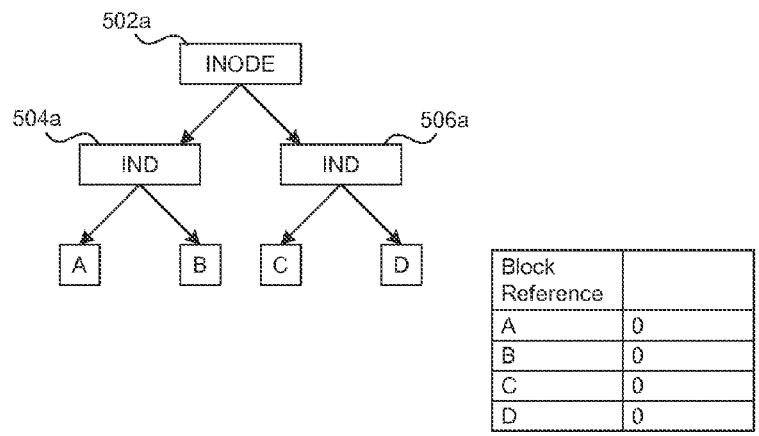
FIG. 5A shows an example source file.
Figure 5B:
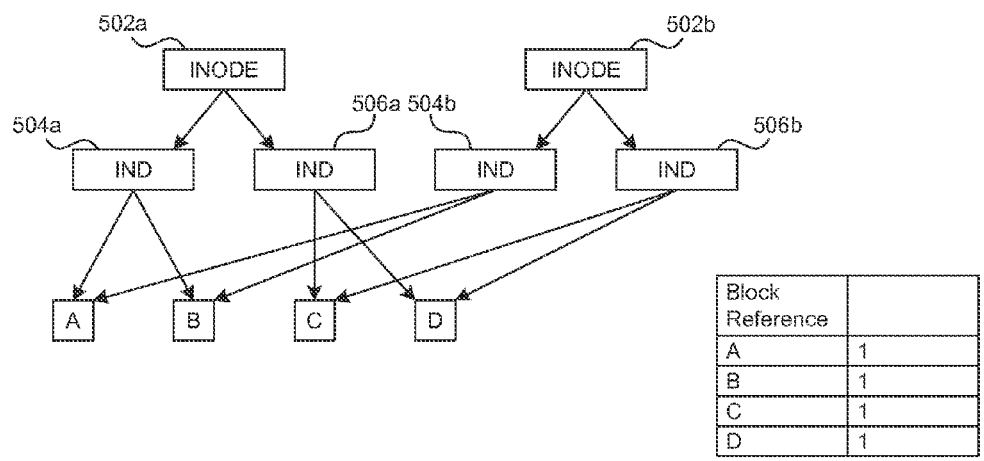
FIG. 5B shows a buffer tree structure that exists immediately after the source file has been copied in a block sharing system.

FIGS. 5A and 5B show an example of a copy operation in a block sharing file system. FIG. 5A shows an example source file 502a. The source file 502a includes references to a first indirect block 504a and a second indirect block 506a. Indirect block 504a includes references to data blocks A and B. Indirect block 506a includes references to data blocks C and D. As shown in the block reference table, each of the data blocks A, B, C, and D is referenced by a single indirect block.

FIG. 5B shows a buffer tree structure that exists immediately after the source file 502a has been copied in a block sharing system. The copy process is discussed below in greater detail with respect to FIGS. 6 and 8. The resulting file system now includes a second file 502b. The second file 502b includes references to a first indirect block 504b, which has references to data blocks A and B, and a second indirect block 506b, which has references to data blocks C and D. As shown in the figure, the indirect blocks 504b and 506b of the file 502b reference the same data blocks as the indirect blocks 504a and 506a of source file 502a. This is further shown by the block reference table in FIG. 5B, which shows that each of the data blocks A, B, C, and D has an additional reference. In some embodiments, the file system can perform sub-file copying, in which the system uses a similar process to copy a subset of the L1 blocks associated with the source file to the destination file.

In some embodiments, the system uses a similar process to generate snapshots of a data set. In these embodiments, the system generates a snapshot container (e.g., an inode) and copies references to the data set's data blocks to the snapshot container. However, a snapshot differs from a simple copy because the snapshot is a point in time copy of the data set and is therefore read-only. In contrast, a copy generated as discussed above is a separate entity in the file system and can be modified independently of the source object.

One skilled in the art will appreciate that copy operations are more efficient in a block sharing file system because the system does not have to copy the data (L0) blocks. However, the time to complete the copy operation varies depending on the number of L1 indirect blocks to copy and can be significant for large files. In order to turn this variable-time process into a substantially constant-time process, the system provides modified implementations of the standard file system operations that can be executed on the file copy even while the indirect blocks are being copied.

Figure 6:
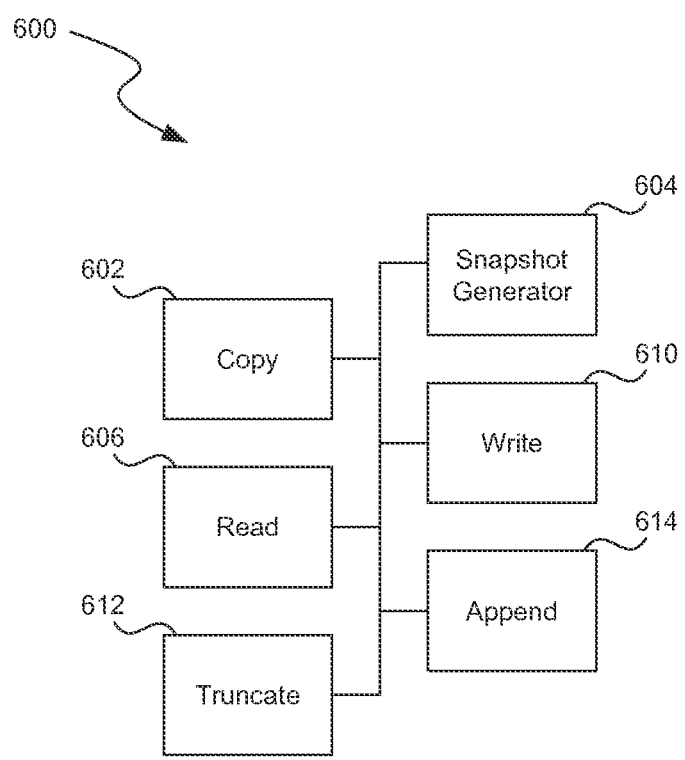
FIG. 6 is a logical block diagram of a copy system.

FIG. 6 is a logical block diagram of the copy system 600 according to a representative embodiment. The system 600 may be implemented as a part of the storage manager 305 in a storage server, such as the storage server 108 of FIG. 1. Aspects of the system may be implemented as special purpose hardware circuitry, programmable circuitry, or a combination of these. As will be discussed in additional detail herein, the system 600 includes a number of modules to facilitate the functions of the system. Although the various modules are described as residing in a single server, the modules are not necessarily physically co-located. In some embodiments, the various modules could be distributed over multiple physical devices and the functionality implemented by the modules may be provided by calls to remote services. Similarly, the data structures could be stored in local storage or remote storage, and distributed in one or more physical devices. Assuming a programmable implementation, the code to support the functionality of this system may be stored on a computer-readable medium such as an optical drive, flash memory, or a hard drive. One skilled in the art will appreciate that at least some of these individual components and subcomponents may be implemented using application specific integrated circuits (ASICs), programmable logic devices (PLDs), or a general-purpose processor configured with software and/or firmware.

As shown in FIG. 6, the system 600 includes a copy component 602, which is configured to create a copy of a source file. In response to a copy command, the copy component 602 generates a new inode (referred to as the "destination inode") and copies the source file's L1 indirect blocks to the L1 indirect blocks of the newly created destination file. In some embodiments, the system creates the buffer tree of the destination inode at the beginning of the copy process. Entries in the L1 indirect blocks of the destination file are assigned a default value indicating that the block has not yet been filled with information copied from the source file. These indirect blocks are referred to as "holes", and may store, for example, null references. In some embodiments, the copy component 602 also marks the destination inode during the copy process (e.g., by setting a flag in the destination inode's metadata) to indicate that the copy process is ongoing. At the end of the process, the copy component 602 removes the mark to indicate that the destination inode can be treated as a normal inode (i.e., an inode that does not require special handling for file system operations).

At the beginning of the copy process, the copy component may also store a parameter specifying a range of blocks to be copied during the copy process. In some embodiments, this range is specified as a maximum file block number to copy to the destination inode, such that the range starts with the first file block number and ends with the maximum file block number.

The system 600 includes additional modules that execute other file system operations during the copy process. In particular, the system 600 includes a snapshot generator component 604, which is configured to generate a snapshot of the source data set at the beginning of the copy process. The system uses the snapshot to support a read operation during the copy process. The read operation is controlled by a read component 606, which is configured to execute read requests that are received during the copy process and are directed to the destination inode. On receiving a read request, the read component 606 determines whether the read request is directed to data that has already been copied to the destination inode. If so, the read component 606 retrieves the desired data through the destination inode. If the request is directed to a block that has not yet been copied, the read component 606 instead retrieves the desired data from the snapshot. Thus, the system uses the snapshot of the source file to ensure that it can always provide the data buffer corresponding to the requested information.

The system also includes a write component 610, which is configured to process write requests that are received during the copy process and are directed to the destination inode. The write component 610 uses similar processing regardless of whether the target block for the write request has been copied to the destination inode. In general, the write component 610 handles a write request by storing a data block on disk with the new data from the write request and replacing the target L1 indirect block entry with a reference to the new data block. As discussed in greater detail below, the copy process includes a check to handle write operations that modify indirect blocks that have not yet been copied.

The system 600 also includes a truncate component 612, which is configured to execute truncate requests that are received during the copy process and are directed to the destination inode. As stated above, the copy component 602 stores information indicating a range of blocks to be copied during the copy process, which initially includes all of the blocks in the source file. When the system receives a truncate request, the truncate component 612 changes the range of blocks to be copied in response to the request. This causes the copy component 602 to stop copying data blocks based on the truncated size, rather than copying the full set of data blocks.

The system 600 also includes an append component 614, which is configured to execute append requests received during the copy process. Because an append operation only adds new indirect blocks to the destination file beyond the range of blocks to be copied, an append operation can be executed during the copy process without risk of conflict. Thus, the append component 614 generates new data blocks based on the append request and appends references to the new data blocks at the end of the file. The append component 614 uses the information indicating the range of blocks to copy to determine the location of the end of the file. This ensures that the new data blocks are added to the end of the file, even if the size of the file has been modified by a previously received truncate request.

Figure 7:
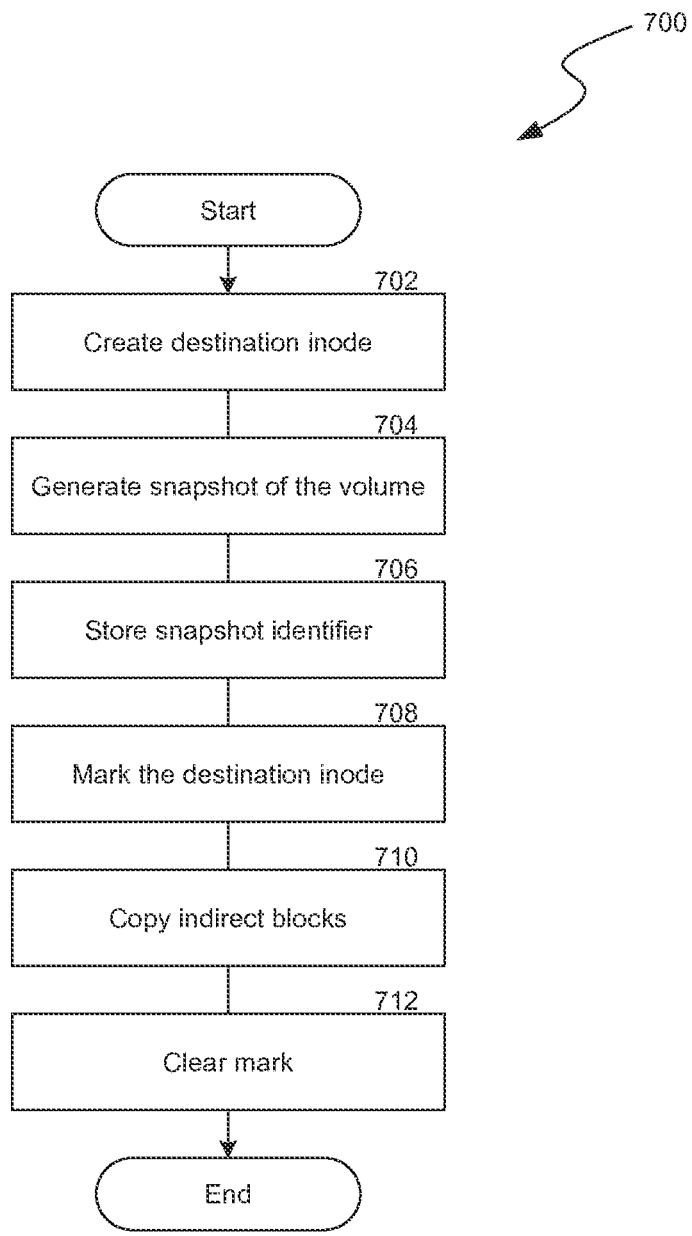
FIG. 7 is a flowchart of a process for copying a source file.

FIG. 7 is a flowchart of a process 700 for copying a source file. Processing begins at step 702, where the system creates the destination inode based on the source inode. The system also initializes the destination inode by specifying a portion of the metadata associated with the destination inode, such as access control information copied from the source inode. The system may also create a buffer tree for the destination inode based on the source inode (i.e., by defining L1, L2, etc. blocks for the destination inode). The indirect blocks at the lowest level of the buffer tree (L1 blocks) are assigned a known value to indicate that they are holes (i.e., indirect blocks that have not yet received their assigned value). For example, the system may place null references in the indirect blocks to indicate that they have not yet been filled by the copy process.

Processing then proceeds to step 704, where the system generates a snapshot of the source file. The system may also lock the snapshot so that it cannot be deleted during the copy process. The snapshot may be generated using any technique known in the art for generating read-only, persistent point-in-time images. In one embodiment, this can be done instantaneously by copying a reference to the topmost block of the file system in a volume as is the case with Snapshots™ generated by systems sold by NetApp, Inc. At step 706, the system stores an identifier for the snapshot to create an association between the snapshot and the destination inode. The identifier enables the file system to retrieve the correct snapshot to support read operations during the copy process. The snapshot identifier may be stored in the destination inode or in a separate metafile used for managing file system operations.

Processing then proceeds to step 708, where the system marks the destination inode to indicate that the copy process is ongoing. As with the snapshot identifier, the mark may be stored as a flag in the inode's metadata or as part of a separate metadata file used for file system management. Processing then proceeds to step 710, where the system copies L1 indirect blocks from the source inode's buffer tree to the destination inode's buffer tree. This process is discussed in greater detail below with reference to FIG. 8. After the system has finished copying the L1 indirect blocks, processing proceeds to step 712, where the system clears the mark on the destination inode. By clearing the mark, the system indicates that the inode is available for regular processing and does not need the special handling discussed below.

As discussed above, the system provides modified implementations of the standard file system operations that can be executed while the system is copying the indirect blocks to the destination inode. Two of these operations, write and truncate, require special handling by the copy process, as well. In particular, because the system executes write operations in the same way for every indirect block in the destination file, the copy process includes a check to ensure that the system does not overwrite an indirect block that has already been modified by a write operation. In addition, the system handles truncate operations by maintaining information specifying a range of blocks to copy to the destination inode. The system then reduces the number of blocks to copy based on the truncate operation. Thus, the copy process includes a check to ensure that the system does not copy blocks that fall outside the truncated size of the destination file.

Figure 8:
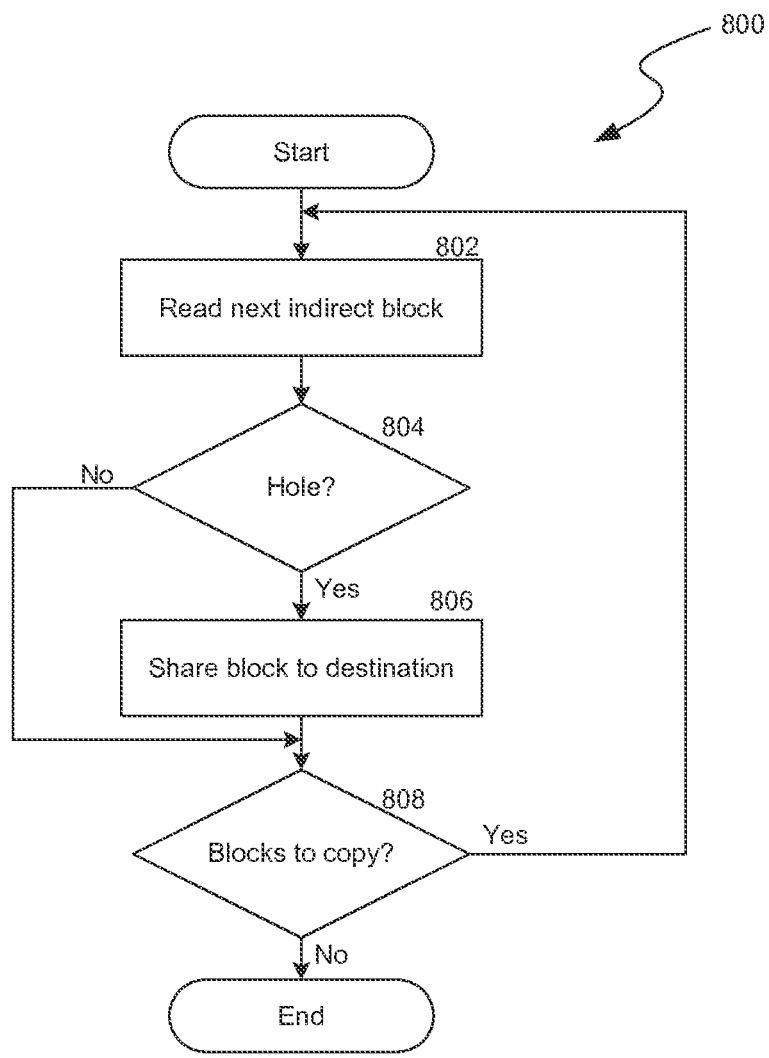
FIG. 8 is a flowchart showing details of a process for copying indirect blocks from the source file to the destination file according to the copy system.

FIG. 8 is a flowchart showing details of step 710 for copying L1 indirect blocks from the source inode's buffer tree to the destination inode's buffer tree according to the copy system. The process 800 is executed as a loop that processes each of the L1 indirect blocks in the source inode until all have been copied. As noted above, this process may include subfile copying, in which a subset of the L1 blocks in the source inode are copied to the destination inode. The subset may be specified, for example, as a range of FBNs in the source inode. Processing begins at step 802, where the system reads the next data block reference from the L1 indirect blocks of the source file. In the first iteration of the loop, the system simply reads the first data block reference in the first L1 indirect block of the source file.

The system then proceeds to decision step 804, where it determines if the corresponding indirect block entry in the destination inode is a hole. As noted above, a hole is an indirect block entry that contains a default value indicating that the entry does not yet point to a direct block. If the system does not receive a write request during the copy process, every L1 indirect block entry will be a hole until the copy component 602 has filled it with the corresponding L1 indirect block entry from the source inode. However, if the system receives a write request directed to a hole, it fills the hole before the copy process reaches it. Thus, in decision step 804, the system determines if the current L1 indirect block entry has already been filled by a write operation and skips the entry if it has been filled.

If the block is not a hole, the system skips copying the indirect block and proceeds to decision step 808. However, if the block is a hole, the system proceeds to step 806, where it shares the L1 indirect block entry with the destination inode. As discussed above for FIGS. 5A and 5B, this is done by copying the reference in the indirect block from the source inode to the corresponding location in the destination inode.

The system then proceeds to decision block 808, where it determines if more indirect blocks remain to be copied. In the absence of a truncate operation, the system repeats the loop until it has processed every L1 indirect block entry from the source inode. However, if the system has received a truncate request, it determines in step 808 whether all L1 indirect block entries have been copied up to the truncated size of the file. This may include comparing the blocks in the destination inode to the information specifying the range of blocks to copy. If additional blocks remain to be copied, the system returns to step 802, where it repeats the loop. Otherwise, the process 800 ends.

As discussed above, append requests are handled in the same way during the copy process as in a standard append operation. In a standard append operation, the file system simply adds new data blocks starting immediately after the end of the blocks in the target file system object. In a modified append operation according to the current system, the system uses the number (or range) of blocks to copy to determine where the new blocks should be added. The appended blocks are then added after the last block of the destination inode. This allows the system to handle cases where it receives both an append request and a truncate request during the copy process. If the append request is received first, the system adds new blocks after the end of the initial set of indirect blocks that were determined based on the source file. If the system then receives a truncate request, it removes the appended blocks first and then changes the range of blocks to copy. If the truncate request is received first, the system changes the range of blocks to copy. When an append request is subsequently received, the system then adds the new blocks at a point determined by the truncated size of the file.

Figure 9:
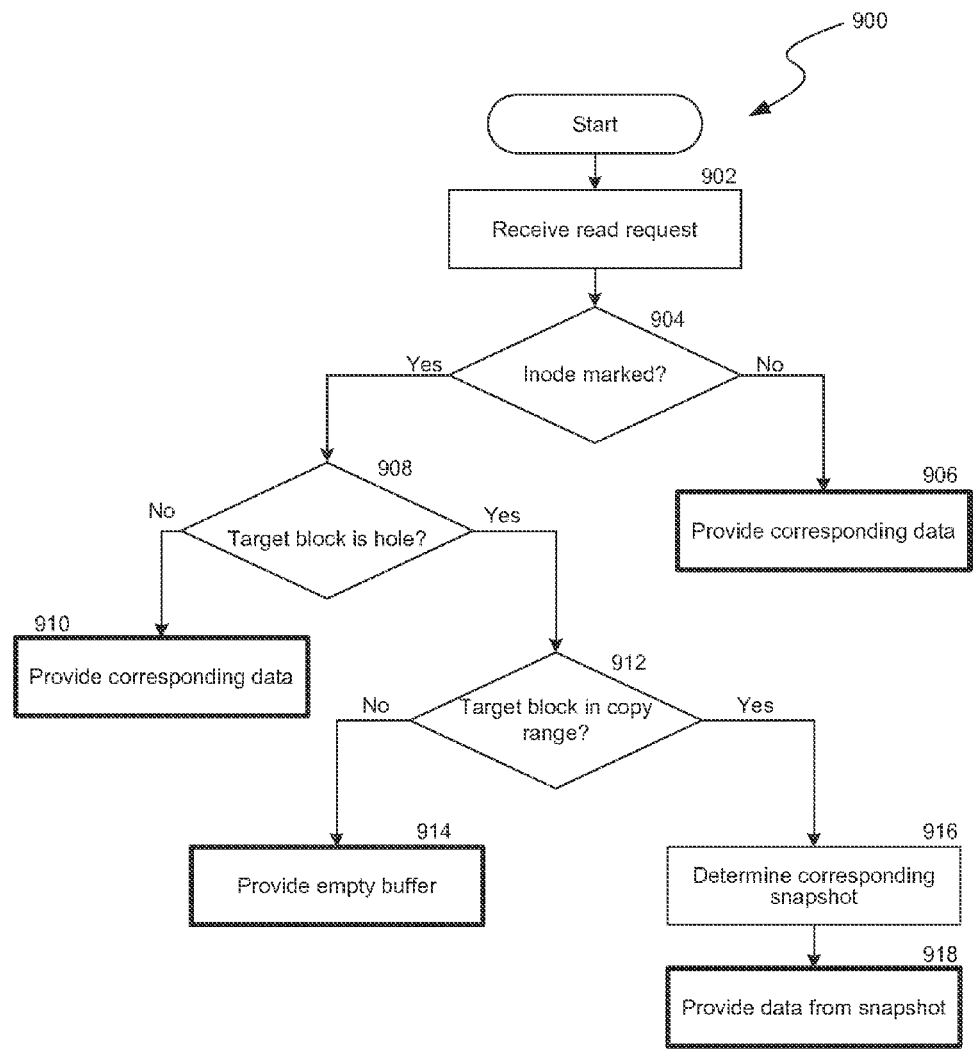
FIG. 9 is a flowchart of a process for handling a read request that is received during the copy process and that is directed to the destination inode.

FIG. 9 is a flowchart of a process 900 for handling a read request that is received during the copy process and that is directed to the destination inode. The system does so by using the snapshot generated in step 704 of the process 700 (FIG. 7), i.e., by redirecting to the snapshot read requests that relate to L1 indirect block entries that have not yet been copied. The process 900 has a number of possible endpoints; for clarity, these endpoints are indicated by a darker outline around the box corresponding to the endpoint.

Processing begins in step 902, where the system receives a read request. The read request includes information such as the target inode and a target block (generally an FBN in the target inode) associated with the request. The system then proceeds to decision step 904, where it determines if the inode is marked. As noted above, the mark is used to indicate that a copy process is ongoing for that inode. If the inode is not marked, the system determines that a copy operation is not ongoing. The system then proceeds to step 906, where it handles the read operation in the standard manner by providing to the client the data in the target block. If the target block was provided as an FBN, the storage manager 305 first determines an indirect block in the inode's buffer tree corresponding to the FBN. The system then uses the VBN stored in the indirect block to retrieve the requested data from the mass storage subsystem 110 (FIG. 1).

If the inode was marked, the system determines that the copy process is ongoing for that particular inode. Processing then proceeds to decision step 908, where the system determines in the manner described above if the target block is a hole. If the target block is not a hole, the block has already been copied by the copy process or a write has occurred in the corresponding data. Thus, the system can respond to the read request as if the copy process is not ongoing. In that case, processing proceeds to step 910, where the system provides the data in the target block. The processing for this step is identical to the processing for step 906.

If the system determines that the target block is a hole, processing proceeds to decision step 912, where the system determines if the requested block is within the range of data blocks to copy (i.e., whether the file has been truncated such that the requested block is no longer part of the file). If the requested block is outside the copy range, the system proceeds to step 914, where it provides an empty buffer in response to the read request.

If the target block is within the range of blocks to copy, the system proceeds to step 916, where it identifies the snapshot corresponding to the inode. As discussed above, this information may be stored in the inode itself or it may be stored in a separate system metadata file. The system then proceeds to step 918, where it provides the requested data from the data in the snapshot. To do so, the system loads information from the corresponding snapshot and uses the target block identified in the read request to find the corresponding block in the snapshot of the source inode. The corresponding block is then returned in response to the read request.

One skilled in the art will appreciate that the processes described in FIGS. 7-9 enable the system to provide a user access to a copy of a file system object as soon as the copy's buffer tree has been created. Thus, the system can execute other file system operations on the copy even though L1 indirect blocks associated with the copy are still being copied. As a result, the operations described in FIGS. 7-9 avoid the wide variation in copy time that typically occur when the system waits for L1 indirect blocks to be copied, making the copy process substantially constant-time from the user's perspective.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. A method comprising:
generating a snapshot of at least a portion of a data set managed by a storage server, wherein metadata in the data set includes a plurality of references to data blocks;
performing a copy operation in the storage server to generate a copy of the data set separate from the snapshot, by defining a set of block locations containing a predetermined reference value and replacing the contents of individual block locations with references to individual data segments;
during the copy operation to generate the copy of the data set separate from the snapshot, receiving from a requester a first read request directed to the copy of the data set that the copy operation is to generate;
providing data from the snapshot to the requester by the storage server, in response to the first read request;
determining a range of references to copy from a source metadata container to a destination metadata container;
stopping the copy operation after the range of references has been copied;
during the copy operation, receiving an append request; and
based on the append request, appending a reference to an appended data segment to the copy of the data set beginning at a location in the copy of the data set determined based on the range of references to copy.

2. The method of claim 1, wherein the predetermined reference value indicates that the set of block locations have not been filled with information from the data set.

3. The method of claim 1, wherein the data set comprises a plurality of references to data blocks and wherein performing the copy operation comprises copying at least a portion of the plurality of references to the copy of the data set.

4. The method of claim 1, further comprising:
making a determination, in response to the first read request, that data targeted by the first read request has not yet been copied from the data set to the copy of the data set, wherein said providing data from the snapshot to the requester is done in response to said determination.

5. The method of claim 1, further comprising:
during the copy operation, receiving a second read request directed to the copy of the data set;
making a determination, in response to the second read request, that data targeted by the second read request has already been copied from the source version of the data set to the copy of the data set; and
providing data from the copy of the data set in response to the second read request and the determination that data targeted by the second read request has already been copied from the source version of the data set to the copy of the data set.

6. The method of claim 1, further comprising:
during the copy operation, receiving a write request directed to a target write location in the copy of the data set; and
modifying the target write location in the copy of the data set based on the write request;
wherein the copy operation includes skipping the copying of the portion of the data set corresponding to the target write location in response to receiving the write request.

7. The method of claim 1, further comprising:
during the copy operation, receiving a write request directed to a target location in the copy of the data set;
determining that the target location is a hole;
generating a data segment based on the write request; and
storing a reference to the generated data segment in the target location.

8. A system comprising:
a memory;
a processor coupled to the memory to execute instructions stored in the memory;
a copy component configured to execute a copy operation based on the instructions stored in the memory to copy a plurality of blocks from a source metadata container to a destination metadata container, wherein the copy operation comprises by defining a set of block locations containing a predetermined reference value and replacing the contents of individual block locations with references to individual data segments; and
a write component configured to execute a modification operation based on the instructions stored in the memory to modify a target block of the destination metadata container during the copy operation in response to a write request to modify the target block, wherein the modification operation comprises generating a new data segment based on the write request; and replacing an individual reference at a block location with a reference to the new data segment,
wherein the copy component is configured to skip copying an individual block of the plurality of blocks that corresponds to the target block of the destination metadata container in response to the write request to modify the target block;
wherein the copy component is further configured to:
determine a first range of blocks to copy from the source metadata container to the destination metadata container based on the contents of the source metadata container;
during the copying, determine a second range of blocks to copy based on a received truncate request; and
stop the copying after copying the blocks in the second range.

9. The method of claim 8, wherein the predetermined reference value indicates that the set of block locations have not been filled with information from the data set.

10. The system of claim 8, further comprising:
a snapshot generator component configured to generate a snapshot of a file system object corresponding to the source metadata container; and
a read component configured to respond to a read request directed to a block of the destination metadata container by providing a data segment from a corresponding block in the snapshot of the source metadata container.

11. The system of claim 8, wherein the copy component is configured to copy the blocks by copying a plurality of references to direct blocks.

12. The system of claim 8, wherein the write component is configured to generate the destination metadata container by generating a plurality of holes in the destination metadata container corresponding to the plurality of block of the source metadata container and to copy blocks by replacing an individual hole of the plurality of holes with a block copied from the source metadata container.

13. A method comprising:
generating a snapshot of at least a portion of a data set managed by a storage server;
marking a metadata flag indicating a copy operation is ongoing;
performing a copy operation in the storage server to generate a copy of the data set separate from the snapshot;
during the copy operation to generate the copy of the data set separate from the snapshot, receiving from a requester a first read request directed to the copy of the data set that the copy operation is to generate;

providing data from the snapshot to the requester by the storage server, in response to the first read request, if the metadata flag is marked;

determining a range of blocks to copy from a source version of the data set to the copy of the data set based on the contents of the source version of the data set; and in response to a received append request, appending a block to the copy of the data set at a location after the range of blocks.

14. The method of claim 13, further comprising:

unmarking the metadata flag after the copy operation is finished.

15. The method of claim 13, further comprising:

providing data to the requester from the copy of the data set separate from the snapshot, in response to the first read request, if the metadata flag is not marked.

16. The method of claim 13, further comprising:

during the copy operation, receiving a second read request directed to the copy of the data set;

making a determination, in response to the second read request, that data targeted by the second read request has already been copied from the source version of the data set to the copy of the data set; and providing data from the copy of the data set in response to the second read request and the determination that data targeted by the second read request has already been copied from the source version of the data set to the copy of the data set.

* * * * *